(12) United States Patent
Gans et al.

(10) Patent No.: US 10,387,341 B2
(45) Date of Patent: *Aug. 20, 2019

(54) APPARATUSES AND METHODS FOR ASYMMETRIC INPUT/OUTPUT INTERFACE FOR A MEMORY

(71) Applicant: MICRON TECHNOLOGY, INC., Boise, ID (US)

(72) Inventors: Dean Gans, Nampa, ID (US); Bruce Schober, Boise, ID (US); Moo Sung Chae, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,286

(22) Filed: Nov. 16, 2018

(65) Prior Publication Data

US 2019/0087366 A1    Mar. 21, 2019

Related U.S. Application Data

(63) Continuation of application No. 15/963,615, filed on Apr. 26, 2018, now Pat. No. 10,180,920, which is a continuation of application No. 14/712,610, filed on May 14, 2015, now Pat. No. 9,965,408.

(51) Int. Cl.
    *G06F 13/16*    (2006.01)
    *G06F 13/40*    (2006.01)

(52) U.S. Cl.
    CPC ...... *G06F 13/1689* (2013.01); *G06F 13/1694* (2013.01); *G06F 13/4068* (2013.01)

(58) Field of Classification Search
    CPC ............. G11C 7/1057; G06F 13/1689; G06F 13/4072; G06F 13/4234
    See application file for complete search history.

(56) References Cited

U.S. PATENT DOCUMENTS

| 7,032,057 | B2  |         | 4/2006 | Horowitz et al. |
| 7,093,183 | B2  | *       | 8/2006 | Chen ................ H03M 13/134 |
|           |     |         |        | 714/785 |
| 7,525,382 | B2  |         | 4/2009 | An et al. |

(Continued)

FOREIGN PATENT DOCUMENTS

| WO | 9948260 A1    | 9/1999  |
| WO | 2014209765 A1 | 12/2014 |
| WO | 2016182740 A1 | 11/2016 |

OTHER PUBLICATIONS

First Office Action ; TW Application No. 105114968, dated Apr. 20, 2017, pp. all.

(Continued)

*Primary Examiner* — Brian T Misiura
(74) *Attorney, Agent, or Firm* — Dorsey & Whitney LLP

(57) ABSTRACT

Apparatuses and methods for asymmetric input output interfaces for memory are disclosed. An example apparatus may include a receiver and a transmitter. The receiver may be configured to receive first data signals having a first voltage swing and having a first slew rate. The transmitter may be configured to provide second data signals having a second voltage swing and having a second slew rate, wherein the first and second voltage swings are different, and wherein the first and second slew rates are different.

18 Claims, 4 Drawing Sheets

(56) References Cited

U.S. PATENT DOCUMENTS

| | | | |
|---|---|---|---|
| 7,622,986 B2 | 11/2009 | Pan et al. | |
| 8,291,139 B2 | 10/2012 | Hollis | |
| 8,605,397 B2 | 12/2013 | Poulton et al. | |
| 8,885,435 B2 | 11/2014 | Gondi et al. | |
| 9,176,908 B2 | 11/2015 | Shaeffer | |
| 9,252,802 B2 * | 2/2016 | Hollis | G06F 13/4221 |
| 9,552,164 B2 | 1/2017 | McCall et al. | |
| 9,875,209 B2 * | 1/2018 | Mishra | H04L 25/4902 |
| 9,965,408 B2 | 5/2018 | Gans et al. | |
| 10,180,920 B2 | 1/2019 | Gans et al. | |
| 2006/0197949 A1 | 9/2006 | Nygren | |
| 2009/0238012 A1 | 9/2009 | Tatapudi et al. | |
| 2013/0227214 A1 | 8/2013 | Horowitz et al. | |
| 2014/0266320 A1 | 9/2014 | Conrow et al. | |
| 2014/0269116 A1 | 9/2014 | Matsuoka | |
| 2016/0335204 A1 | 11/2016 | Gans et al. | |
| 2018/0246822 A1 | 8/2018 | Gans et al. | |

OTHER PUBLICATIONS

International Search Report and Written Opinion for PCT/US2016/029541 dated Aug. 16, 2016; pp. all.
English translation of First Office Action for KR Application No. 10-2017-7024105, dated Nov. 21, 2018, pp. all.
Extended European Search Report received for EP Appl. No. 16793161.7 dated Dec. 11, 2018; pp. all.

* cited by examiner

US 10,387,341 B2

APPARATUSES AND METHODS FOR ASYMMETRIC INPUT/OUTPUT INTERFACE FOR A MEMORY

CROSS REFERENCE TO RELATED APPLICATION(S)

This application is a continuation of U.S. patent application Ser. No. 15/963,615 filed Apr. 26, 2018 and issued as U.S. Pat. No. 10,180,920 on Jan. 15, 2019, which is a continuation of U.S. patent application Ser. No. 14/712,610 filed May 14, 2015 and issued as U.S. Pat. No. 9,965,408 on May 8, 2018. The aforementioned applications, and issued patents, are incorporated herein by reference, in its entirety, for any purpose.

BACKGROUND

Most electronics systems include multiple devices communicating with one another via a connection, such as conductive traces on a printed circuit board on which the devices are mounted or conductive traces connecting different areas of an integrated circuit on a single die. While the various devices included in an electronics system may be internally operating at different speeds, the communications that occur between the devices may be operating based on a system clock. This system clock may determine input/output (I/O) speeds of the host system and may also be limited by the slowest device in the system. For some devices, a logic device for example, a fast system clock may pose no problems because the internal components of the device, e.g., transistors, may operate based on a higher clock rate than the system clock. For other devices, however, a system clock that begins to reach their maximum internal operating speeds begins to pose problems for I/O operations.

The differences between the internal operating speeds of the various devices may be influenced by their respective fabrication processes. For example, a logic fabrication process used to fabricate logic devices e.g., systems on a chip, processors, controllers, etc.) may be optimized for operating speed. The logic fabrication process optimized for operating speeds may thus produce transistors and circuits that are capable of performing at high clock rates. The fabrication process therefore provides fast transistors that may display fast switching times and sharp slew rates. The transistors may also be more sensitive to input voltage changes. Accordingly, devices built on logic fabrication processes may have sensitive input circuits that are capable of detecting input signals characterized by small voltage swings. Further, output circuits of these devices may be capable of driving signals of large voltage swings at fast slew rates.

Other devices, on the other hand, may have comparatively slower transistors, which may result in comparatively slower internal operating rates and I/O rates. Memories, for example, may be fabricated using a memory fabrication process that is optimized for data retention, not transistor speed. Consequently, the transistors built on a memory fabrication process may require larger voltages for enabling/disabling transistors and which may drive signals at comparatively slower slew rates, for example. As such, the input circuits may require input signals of larger voltage swings compared to logic devices so that the inputs are reliably detected. Further, the output circuits may drive large voltage swing signals at comparatively slow slew rates. Because the input and output circuits are similarly processed, they may conventionally be designed to detect and transmit signals of similar voltage swings. As a consequence, a maximum I/O rate the output circuits are capable of reaching may be limited due to the slew rate.

At higher I/O rates, a memory output circuit may not be able to reach the designed output voltage swing due to the limited slew rate during a clock cycle. As such, a device receiving outputs from the memory, e.g., a memory controller or a system on a chip, may not receive reliable signals at those higher I/O rates.

DETAILED DESCRIPTION

Figure 1:
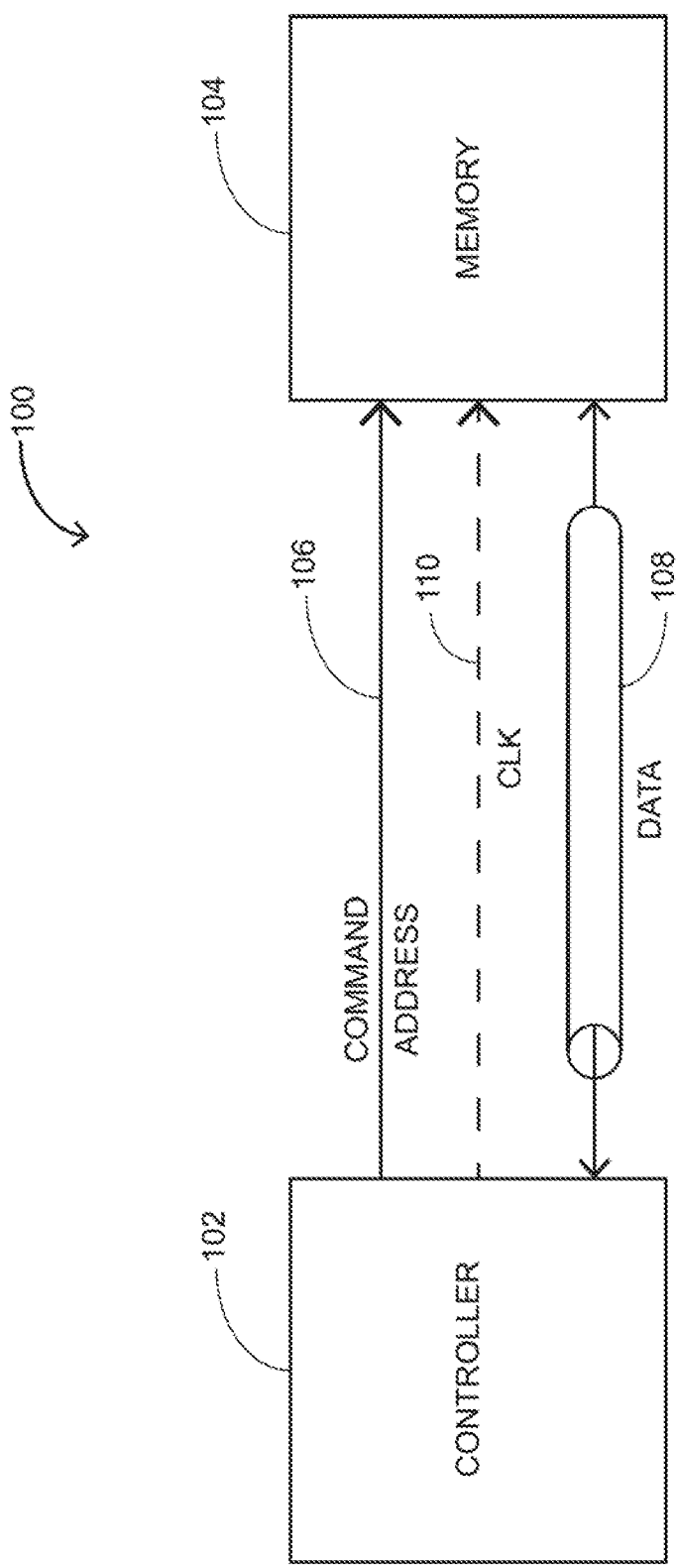
FIG. 1 is a system according to the present disclosure.

Apparatuses and methods for an asymmetric input/output interface for a memory are disclosed herein. Certain details are set forth below to provide a sufficient understanding of embodiments of the disclosure. However, it will be clear to one having skill in the art that embodiments of the disclosure may be practiced without these particular details. Moreover, the particular embodiments of the present disclosure described herein are provided by way of example and should not be used to limit the scope of the disclosure to these particular embodiments, hi other instances, well-known circuits, control signals, timing protocols, and software operations have not been shown in detail in order to avoid unnecessarily obscuring the disclosure.

As discussed above, various devices (e.g., integrated circuits such a logic devices, memory controllers, systems on a chip, processors, and memories) of an electronic system may perform at varying rates, such as internal operation rates and I/O rates (the rate at which the device may be able to receive and/or provide data externally), which may be different. As used herein, rate may refer to a clock rate at which the devices may operate, either internally, as I/O transfer rate. In some embodiments, the internal rate and the I/O transfer rate may be the same. These various operating rates may limit the highest operating rate at which the electronic system may operate. The internal operating rates at which the slowest device may operate may also affect the rate at which data may be transferred (e.g., transmitted, provided, sent) by that device. The variation in operation rates, for example, may be a byproduct of associated fabrication processes. For example, a memory controller or system on a chip may be fabricated with a logic fabrication process, while a memory may be fabricated on a memory fabrication process.

A memory controller, for example, which may be the interface between memory and other devices of an electronic system, such as a processor, may be fabricated using a logic fabrication process. The logic fabrication process, which may be optimized for fast operating rates, may produce transistors that may be characterized as fast so that they operate at higher operating rates. The transistors may also be more sensitive. In this light, transmitters (e.g., output drivers) of the memory controller may be able to drive data signals having large voltage swings with a fast, slew rate even at fast clock rates. Further, receivers of the memory controller may be able to receive and reliably detect signals having lower voltage swings.

In contrast, a memory, whether volatile or nonvolatile, may be fabricated using a fabrication process that is optimized for data retention, which may not produce transistors that are as fast or sensitive as transistors fabricated by a logic fabrication process. As such, I/O circuits of the memory, e.g., transmitters and receivers, may not be able to reliably detect inputs having low voltage swings, and nor may they be able to provide signals having large voltage swings at high (fast) clock rates. This latter issue may be due to the limited slew rate memory fabrication-based transmitters may be able to obtain. While some design considerations may produce drivers that provide relatively faster slew rates, the memory-focused fabrication process may limit the slew rate the transmitters are able to provide. The limited slew rate may be acceptable at low clock rates, 2.0 GHz for example, but may cause problems at higher clock rates, 3.0 GHz and above for example. The slow slew rate combined with providing large voltage swings may be a problem at the high clock rates because an output signal may not make the full voltage swing (e.g., from zero to one volt or vice versa) within a clock cycle, thus resulting in incomplete waveforms that may be indecipherable by a receiving device (e.g., a memory controller).

As an example, a memory may be provided data, e.g., received, having voltage swings of one volt or more, where voltage swing may be defined as a maximum voltage change of the signal from a negative voltage to a positive voltage, or vice versa. The large voltage swing may be necessary for the memory to adequately detect the signal changes, and hence the data. A memory controller may be able to provide the large voltage swings at high clock rates, e.g., 5 GHz or more, due to the memory controller's transistors being able to drive fast slew rates, where a slew rate is the rate of change of a signal measured in voltage per time. The memory, on the other hand, may not be able to similarly drive signals having those slew rates under the high clock rate condition because of the limits of the memory fabrication process. The memory, however, may be able to provide data signals having smaller voltage swings under the high clock rate condition even with the comparatively slower slew rate. Additionally, because the memory controller is capable of detecting signals of lower voltage swings, the data may be transmitted to the controller at the higher dock rate without affecting the reliability of a host system. Thus, at a maximum slew rate obtainable by the memory, a voltage swing may be chosen so that data signals are driven to the full voltage swing within a clock cycle so that discernable data signals are provided to a memory controller.

FIG. 1 is a block diagram of an apparatus 100 (e.g., an electronic device, a smartphone, a computing device, a wearable electronic device, etc.) according to an embodiment of the present disclosure. The apparatus 100 may include a controller 102 (e.g., memory controller or a system on a chip) and a memory 104. The controller 102 and the memory 104 may be coupled to each other by a command and address bus 106, and a data bus 108, which may be bi-directional. In some examples, the memory 104 may be a volatile memory, such as a synchronous double data rate random access memory (SDDRAM), synchronous DRAM, DDRAM, etc. and in other examples, the memory 104 may be a nonvolatile memory, such as NAND flash, NOR flash, phase change memory, etc. The memory 104 may be configured to store information and perform memory commands, e.g., writes and reads, when prompted. For write commands, the memory 104 may be configured to receive data from the controller 102 having a large voltage swing (peak-to-peak voltage swing of 1.0 volts, for example) and having a fast slew rate (10 volts per nanosecond, for example). Conversely, in response to read commands, the memory 104 may provide data to the controller 102 having a comparatively lower voltage swing (peak-to-peak voltage swing of 0.4 volts, for example) and having a comparatively slower slew rate (4 volts per nanosecond, for example).

The voltage swings and slew rates referenced above are discussed comparative to one another and the numerical voltage swings and slew rates are given as non-limiting examples. Slew rates and voltage swings of different numerical values are contemplated and covered by the present disclosure. Further, the signals having the fast slew rate and large voltage swing received by the memory 100 may be greater (faster and larger) than the signals having the slower slew rate and the lower voltage swing than the signals provided by the memory 100.

The data bus 108 may provide a plurality of conduction paths or channels for data to be transferred (e.g., provided, driven, transmitted, etc.) between the controller 102 and the memory 104. Each of the plurality of channels may be used to provide a single bit of data, e.g., D0 through Dn, in one example. Since both the controller 102 and the memory 104 may transmit and receive data, each channel may include both a transmitter and a receiver, such that a channel may include the corresponding transmitters and receivers (or transceivers) included in the controller 102 and the memory 104. Each transmitter and receiver may operate in accordance with a clock signal, such as provided by clock 110. In another example, the plurality of conduction channels of the data bus 108 may, be associated in pairs so that data is transferred in a differential scheme, such that for each data bit a true value and a complementary value are transferred between the devices. Using a non-differential scheme, n bits of data may be simultaneously transmitted, whereas in the differential scheme, n/2 bits may be simultaneously transmitted for n channels. A third example may include serially transmitting data over the data bus 108, which may reduce the number of channels, but both devices may require serializers and deserializers for this example.

Alternatively, each of the plurality of channels of the data bus 108 may include a plurality of lanes, with each lane including three conductors, for example. In this configuration, the three-conductor lanes may be used for transmission of three-phase symbols, where each symbol is generated by encoding multiple data bits. Two or more bits may be encoded to generate each symbol, for example. The clock signal may further be encoded into each symbol so that a separate clock signal path between the controller 102 and the memory 104 may not be included in the system 100. This configuration may also be used in conjunction with a bi-directional data bus and further uses differential transmitters and receivers. By encoding a number of bits into a single symbol, the data transfer rate between the controller 102 and the memory 104 may reach a higher clock rate at which the controller 102 may operate.

The controller 102 may provide memory commands and corresponding addresses via the command and address (C/A) bus 106. The C/A bus 106 may be a common bus or it may be two separate busses, e.g., a command bus and an address bus. Commands and addresses may be provided by the controller 102 either synchronously or asynchronously. Data may be provided by the memory controller 102 to the memory 104 via the data bus 108, with the data also being provided either synchronously or asynchronously. The memory controller 102 may also provide a clock signal to the memory 104 separately from the data and the commands addresses as indicated by the dashed line 110. Alternatively, the memory controller 102 may not provide a clock signal to the memory 104 separately, but instead may embed the clock signal in the data signals. For example, in some embodiments, the clock signal may be derived by the memory 104 from data signals provided on the data bus 108 through clock data recovery techniques. The clock signal may be used to determine timing of commands performed by the memory 104. For example, the controller 102 may transmit a read command to the memory 104 and expect the data to be present on the data bus 108 at a certain number of clock cycles later. The clock signal may then be used by the memory to determine when to provide the data on the data bus 108 as expected.

In operation, the controller 102 may provide a write command and a memory address on the C/A bus 106 along with the data to be stored at that memory address, which may be provided on the data bus 108. The data provided by the controller 102 may be provided having voltage swings, e.g., a voltage difference between high and low signal levels, that are at least detectable by the memory 104. The voltage swing provided by the controller 102 may be determined by input circuits, e.g., receiver circuits, of the memory 104. For example, the controller 102 may drive data signals with a 1 volt voltage swing, which may be detectable by the memory 102. For differential transmission, the voltage difference on the data bus 108 between the true and the complementary data bits would thus be driven to a 1 volt difference by the controller 102. Read commands provided by the controller 102 may be accompanied by a memory address. In response to the read command, the controller 102 may receive the requested data from the memory 102 via the data bus 108. The data received from the memory 104 may be provided having a smaller voltage swing compared to the data that is provided to the memory 104. The memory controller 102, because of its fabrication process, may be able to detect input signals having a lower voltage swing than the memory 104 is capable of detecting.

The memory 104 may receive the commands, addresses, and data from the memory controller and perform those commands in response. For example, when a write command is received, the memory 104 may store data received over the data bus 108 at a received memory array address. As noted, the data may be received having a voltage swing of 1 volt, for example, which may be detectable by the memory 104. In response to read commands, the memory 104 may provide data to the memory controller 102 via the data bus 108. Similarly to above, the memory 104 may provide data to the memory controller 102 having a voltage swing less than that of received data. The lower voltage swing may be detectable by the memory controller 102 because of the performance of its input circuits. For example, the memory controller may receive data signals with a voltage swing of 0.4 volts.

The voltage swing provided by the memory 104 may be determined by the slew rate the memory is capable of driving, the I/O rate, and the minimum detectable signal by the controller 104. It may be desirable for the data signals provided by the memory 104 to reach the max voltage swing for a minimum amount of time within a clock cycle for the controller to reliably detect the signal. Because the slew rate represents a rate of voltage change per period of time, a slow slew rate may require more time to reach a desired voltage swing. Yet, under fast I/O conditions, signals driven with a slow slew rate may not reach the max voltage swing during a clock cycle, which may result in undetectable signals for the controller 102. To reduce the chance of undetectable signals, the max voltage swing driven by the memory 104 may be reduced so that a detectable signal is provided at an obtainable slew rate at a given I/O rate.

The targeted voltage swing of the data driven by the memory 104 may be less than the voltage swing of data received due to a limited slew rate the memory 104 may be able to drive. As noted above, output circuits, e.g., transmitters, of the memory 104 may be limited by the fabrication process of the memory 104. A slower slew rate may not be able to provide a large voltage swing at high I/O rates. However, if the voltage swing is reduced for the output circuits, then higher I/O rates may be capable for the memory 104. Thus, by providing an asymmetric I/O scheme by the memory 104, limits to I/O rates may be averted.

Figure 2:
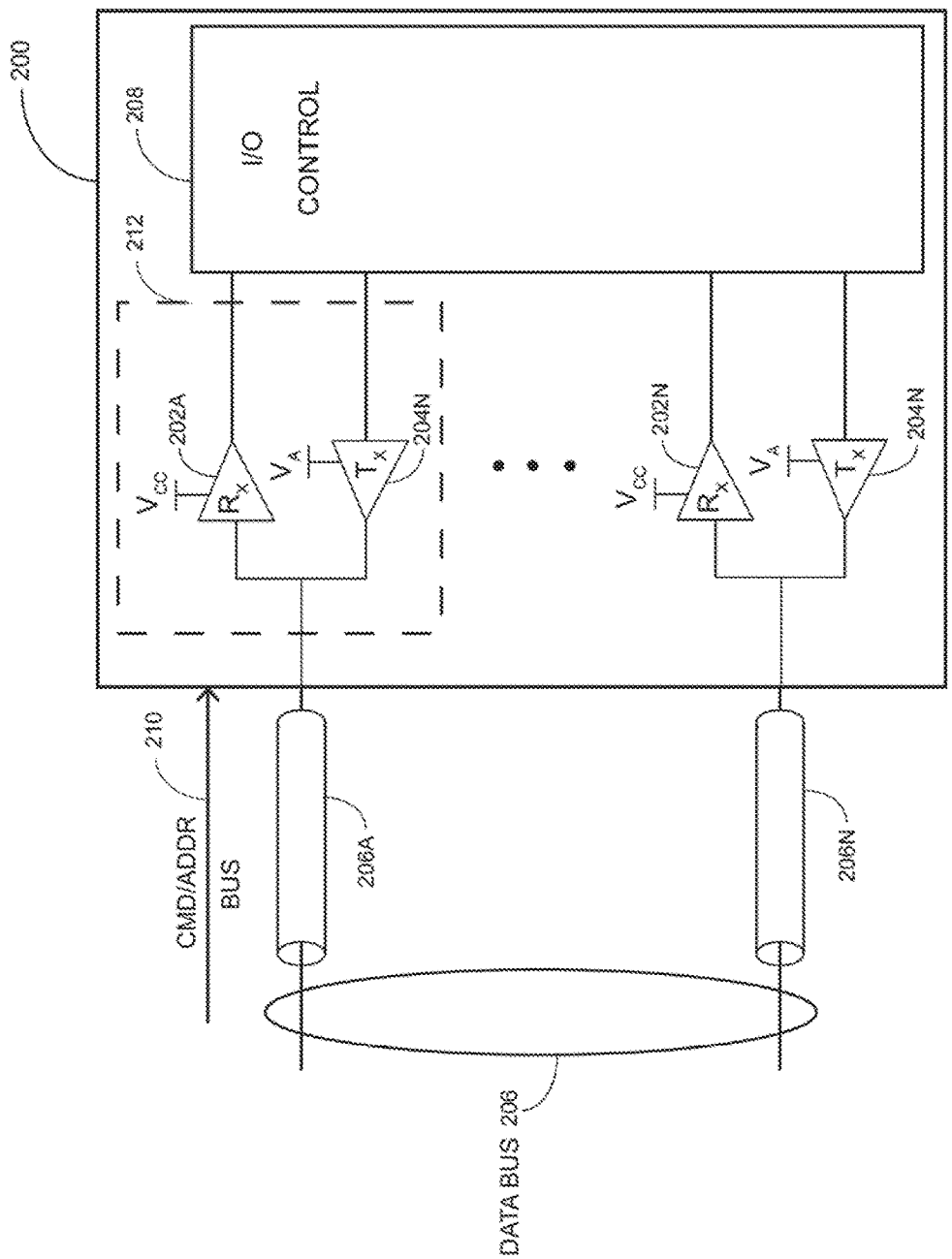
FIG. 2 is a block diagram of an apparatus according to the present disclosure.

FIG. 2 is a block diagram of an apparatus 200 according to an embodiment of the present disclosure. The apparatus 200 may be a memory device, such as the memory 104 of FIG. 1. The apparatus 200 may include a plurality of receivers 202A-N, a plurality of transmitters 204A-N, and an I/O control 208. The apparatus 200 may receive commands and addresses from a memory controller or other logic device (not shown), for example, via a CMD/ADDR (C/A) bus 210. Data, either received by or provided by the apparatus 200, may be transferred over the data bus 206. The data bus 206 may include a plurality of channels 206A-N, which may be coupled to a corresponding number of pairs of receivers 202A-N and transmitters 204A-N. A receiver and transmitter pair may alternatively be referred to herein as a transceiver 212. The I/O control 208 may provide control signals to the receivers 202A-N and/or the transmitters 202A-N in response to write and read commands so that data may be received or transmitted, respectively.

The data bus 206 may be bi-directional and used for either conventional data transmission, e.g., a single bit per channel of the bus, or differential data transmission, e.g., pairs of channels for true and complementary data bits. For conventional data transfer, a channel of the data bus 206, such as channel 206A, may be coupled to a receiver 202 and transmitter 204 pair, such as receiver 202A and transmitter 204A, which may collectively be referred to as transceiver 210. The N channels of the bus 206 may carry N data bits. Alternatively, the data bus 206 may use multiple conductors per channel for the transmission of multi-phase symbols.

For differential data transmission, the data bus 206 may be characterized as including a plurality of pairs of channels that are configured to carry a true bit value and a complementary bit value. For each pair of channels, a pair of transceivers may be coupled to receive and transmit the bit and complementary bit. For example, the channel 206A may catty a bit value while a channel 206B (not shown) may can the complementary bit value. For receipt and transmittance of bit values, the channels 206A and 206B may be coupled to receiver 202A/transmitter 204A and receiver 202B (not shown) and transmitter. 204B (not shown). In this example configuration, the receiver 202A may receive a true bit value while the receiver 202B may receive the complementary value. By extension, the transmitter 204A may transmit a true bit value, while the transmitter 204B may transmit the complementary value. In the differential data transmission scheme, the N channels of the data bus 206 may transmit N/2 data bits. To transfer the same amount of data per cycle as the conventional method, the differential transmission scheme may transmit at twice the clock rate. As such, the transmitters 204A-N may transmit data at a lower voltage swing due accommodate the higher clock rate.

For multi-phase symbol transmission, each channel of the data bus 206 may include a plurality of lanes, with each lane including a plurality of conductors. For example, each lane may include three conductors. In this configuration, the three-conductor lanes may be used for transmission of three-phase symbols that have been encoded with multiple bits, two bits per symbol for example. The clock signal may also be encoded into each symbol. This configuration may also be implemented using a bi-directional data bus and differential transceivers. As noted above, encoding a number of bits into a single symbol may allow for higher clock rates.

The I/O control 208 may control the receivers 202A-N and the transmitters 204A-N during I/O operations. For example, the I/O control 208 may enable one or more of the receivers 202A-N during a write operation so that data provided by a memory controller, for example, over the data bus 206 may be received by the memory. Conversely, the I/O control 208 may enable one or more of the transmitters 204A-N during a read operation so that data may be transmitted over the data bus 206. The I/O control 208 may provide enabling control signals to the receivers and transmitters based on commands received over the C/A bus 210 and a clock signal (not shown).

The receivers 202A-N may receive data from the data bus 206, which may be provided by a memory controller. The data on each channel 206A-N may be provided having large voltage swings so that the data may be detectable by the receivers. There may be a minimum voltage swing at which each of the receivers 202A-N may reliably detect the data signals, one volt for example. The minimum voltage swing, which may be high compared to a logic device, may be based on the processing of the apparatus 200. A reference supply of the apparatus 200, such as Vcc, may provide power to each of the receivers 202A-N. The receivers 202A-N may include a sense amplifier and a latch for receiving incoming data, but other receivers known to those of skill in the art also fall under the scope of the present disclosure.

The transmitters 204A-N may transmit (e.g., provide, drive, transfer) data from the apparatus 200 to a memory controller, for example. The transmitters may be enabled by the I/O control 208 for driving data onto the data bus 206. The data may be driven having a voltage swing that is different than the voltage swing data is received at by the receivers 202A-N. The slew rate the transmitters 204A-N may be able to obtain may be less than a slew rate the received data is provided. As noted, the lower slew rate may limit a voltage swing the transmitters are capable of driving at high clock rates, 3.0 GHz and above for example. If, for example, the transmitters were configured to provide data at a voltage swing comparable to the voltage swing of received data, the transmitters may not be able to make the full voltage swing at high clock rates. However, a device receiving data from the apparatus 200 may be able of detecting comparatively smaller voltage swings, 0.4 volts for example. Thus, the transmitters 204A-N may provide data based on a reference voltage $V_A$, which may be lower than the reference voltage Vcc.

In operation, the apparatus 200 may receive data from a device, such as a memory controller, having a voltage swing large enough for the apparatus 200 to detect, which may be based on the characteristics of the receivers. The large voltage swing may be easy for a memory controller to provide due to the faster, more powerful transmitters the memory controller includes. The apparatus 200, however, may provide data to the memory controller having a lower voltage swing since the memory controller can detect the lower voltage swing. The lower voltage swing may be provided due to a limit in the slew rate the transmitters of the apparatus 200 may obtain, which may also limit the I/O rate. Thus, to transmit data at high I/O rates and without adjusting the slew rate, the transmitters 204A-N may provide, data having the lower voltage swings. The lower voltage swing may allow the provided data to make a full voltage swing within a clock cycle.

Figure 3:
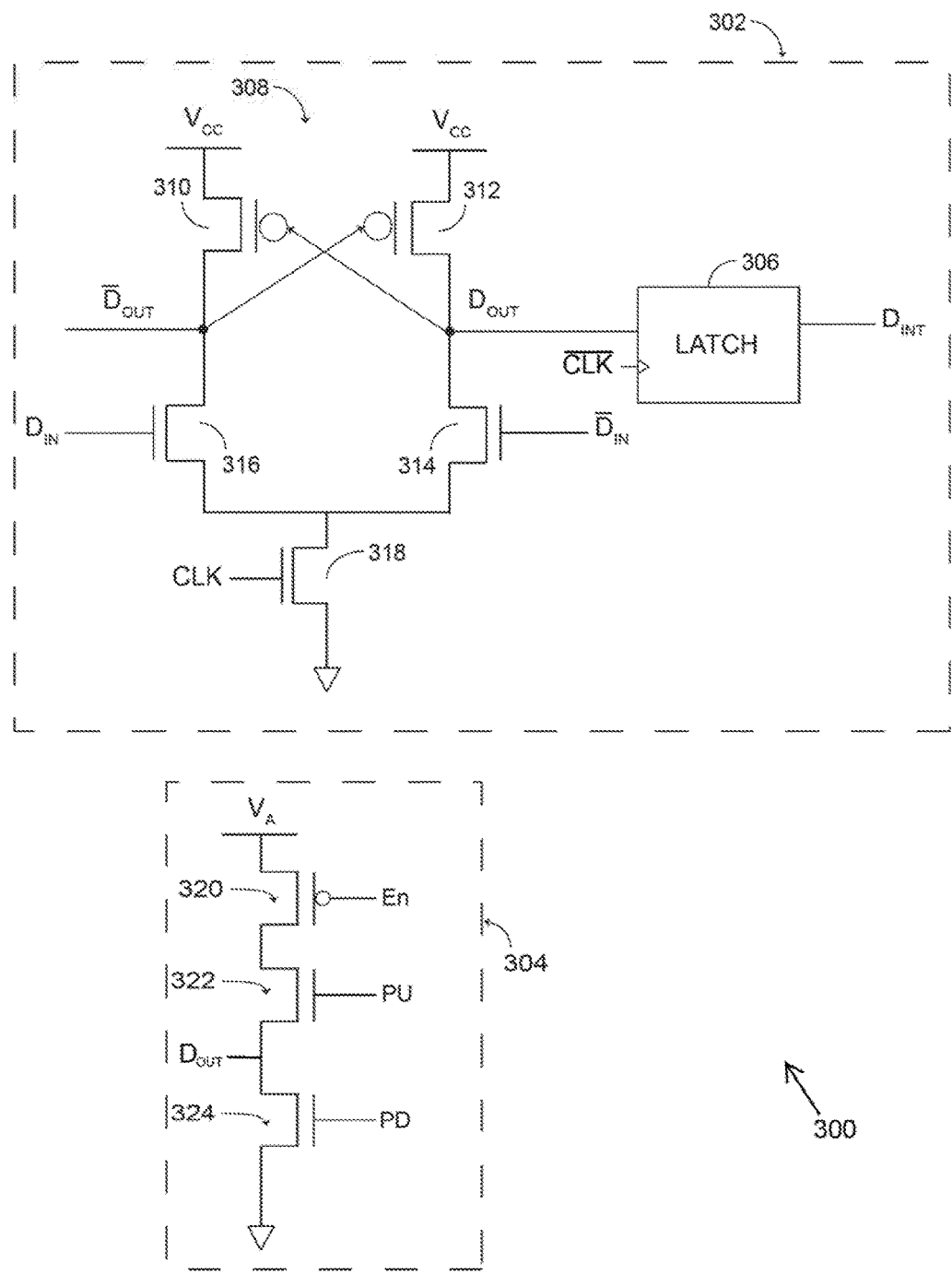
FIG. 3 is a schematic diagram of a transceiver according to the present disclosure.

FIG. 3 is example schematic of a transceiver 300 in accordance to the present disclosure. The transceiver 300 may be an example transceiver 212 of FIG. 2. The transceiver 300, which may include a receiver 302 and a transmitter 304, may represent, for example, a receiver/transmitter pair 202, 204 of FIG. 2. The transceiver 300 may receive data over a data bus (not shown) and provide data over the same data bus. The data may be provided by a memory controller or a system on a chip, for example. The data may be provided at a large voltage swing, driven at a fast slew rate at a fast I/O rate. For example, at an I/O rate of 3.2 GHz, the transceiver 300 may receive data having a 1 volt voltage swing and having a slew rate of 10 V/ns. Conversely, the transceiver 300 may provide data to the memory controller having a comparatively low voltage swing and having a lower slew rate but at the same I/O rate. For example, at the I/O rate of 3.2 GHz, the transceiver 300 may provide data having a voltage swing of 0.4 volts and having a slew rate of 4 V/ns. Thus, the transceiver 300 is configured for asymmetric I/O.

The receiver 302 may include a sense amplifier 308 coupled to a latch 306. The sense amplifier 308 may include transistors 310-318 configured substantially as shown in FIG. 3. The transistors 310 and 316 may be coupled in series between a voltage supply Vcc and the transistor 318, respectively. Similarly, the transistors 312 and 314 may be coupled in series between the voltage supply Vcc and the transistor 318, respectively. The gate of the transistor 310 may be coupled to a node coupling the transistors 312 and 314. Likewise, the gate of the transistor 312 may be coupled to a node coupling the transistors 310 and 316. The transistor 318 may enable the sense amplifier 308 based on a respective gate coupled to a clock signal, for example. One skilled in the art would understand the operation of the sense amplifier and sense amplifier variations, all of which fall within the scope of the present disclosure.

In operation, the transistor 318 may receive a control signal for enabling the sense amplifier 308. A CLK signal is shown in FIG. 3 as the control single, but an enable signal not dependent upon a CLK signal may also be used. An I/O control may provide the enable signal, such as the I/O control 208 of FIG. 2. The sense amplifier may receive data from a data bus (not shown) and provide the data to the latch 306, which in turns latches the data based on a control signal. The sense amplifier 308 is depicted as receiving differential data signals, Din and Din\. The differential data signals Din and Din\ are provided to the gates of the transistors 316 and 310, respectively. In response, the sense amplifier 308 provides the data output signal Dout. The Dout signal may be coupled to an input of the latch 306, which may latch the Dout signal based on a control signal, CLK\ as depicted in FIG. 3, and provide a $D_{INT}$ signal.

The transmitter 304 may include series coupled transistors 320-324 and configured substantially as shown in FIG. 3. Transistor 320 may be coupled between a voltage reference $V_A$ and the transistor 322. The transistor 324 may be coupled between a ground reference and the other side of the transistor 322. The voltage reference $V_A$ may be less than the voltage reference Vcc. For example, $V_A$ may be 0.4 volts. An output of the transmitter 304 may be taken from a node coupling the transistors 322 and 324. One skilled in the art would understand the operation of the transmitter 304 and transmitter variations, all of which fall within the scope of the present disclosure.

The transmitter 304 may provide a data signal based on receiving a pull down signal PD, a pull up signal PCS or a sequence of PD and PU signals, for example. The PU and PD signals couple the Dout node to either the reference voltage $V_A$ or the ground voltage, respectively, to drive the Dout node to low or high voltages or swing from one level to the other. The rate of change from one level to the other may be determined by a slew rate that may be obtained by the transistors 322 and 324. A maximum slew rate may affect a maximum operating speed of the transmitter 304.

In operation, the transmitter 304 may be enabled by turning on transistor 320 based on receiving an enable signal. The enable signal may be provided by an I/O control, such as the I/O control 208 of FIG. 2. The output data may be provided as a high or a low voltage, or driven from a high to a low voltage, or vice versa, determined by which of the two transistors 322 and 324 are enabled. If, for example, data is to be presented by a swing from a low to a high voltage, the pull down transistor 324 may first be enabled with the PD signal, and then the output data may be switched to a high voltage by disabling the pull down transistor 324 and enabling the pull up transistor 321. This transition may provide a data signal that goes from zero volts to voltage $V_A$, for example. This rate of change may be determined by a slew rate the transistors 322 and 324 are capable of obtaining, which may be a function of the transistor's drive strength. The drive strength may be a product of the size and doping profiles of the transistors, for example, which may be determined by the process used for fabricating the transistors.

The transceiver 300 may be configured to receive data based on a first voltage swing, level, which may be provided having a fast slew rate, and provide data having a second voltage swing level, which may be provided having a relatively slower slew rate. The first and second voltage swings may be based on the capabilities of the receiving devices, e.g., a minimum detectable voltage swing for sensing an input. The slew rates, however, may be determined by the transmitters. As such, at a high clock rate, a transmitter characterized by a relatively slow slew rate may not be able to provide data having large voltage swings. However, if data is provided having a lower voltage swing that is detectable by a receiving device, then the slower slew rate may not be a limiting factor for I/O rates.

Figure 4:
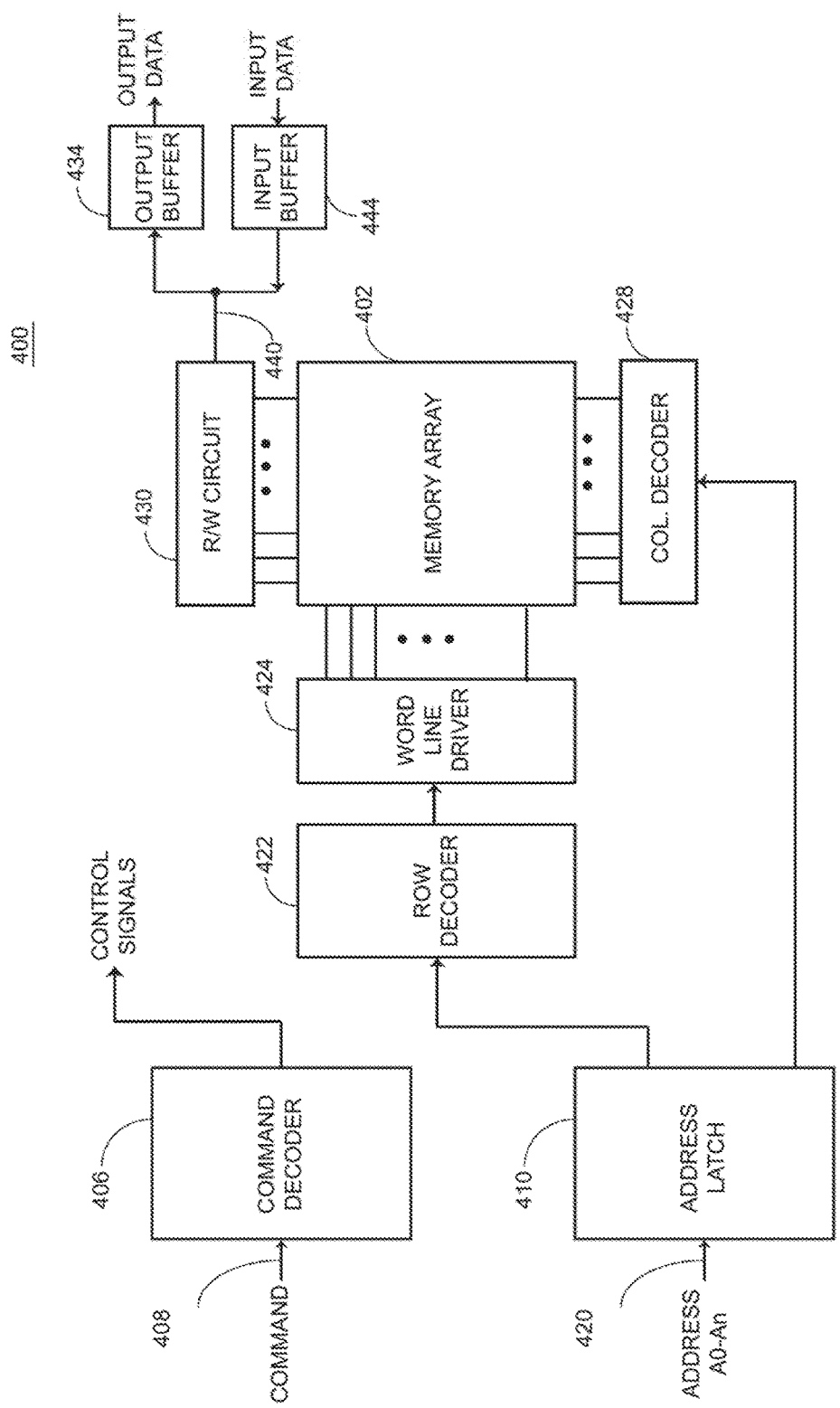
FIG. 4 is a memory according to the present disclosure.

FIG. 4 illustrates a memory 400 according to an embodiment as discussed herein. The memory 400 includes an array 402 of memory cells, which may be, for example, volatile memory cells (e.g., DRAM memory cells, SRAM memory cells), non-volatile memory cells (e.g., flash memory cells), or some other types of memory cells. The memory system 400 includes a command decoder 406 that receives memory commands through a command bus 408 and generates corresponding control signals within the memory system 400 to carry out various memory operations. The command decoder 406 responds to memory commands applied to the command bus 408 to perform various operations on the memory array 402. For example, the command decoder 406 is used to generate internal control signals to read data from and write data to the memory array 402. Row and column address signals are applied to the memory system 400 through an address bus 420 and provided, to an address latch 410. The address latch then outputs a separate column address and a separate row address.

The row and column addresses are provided by the address latch 410 to a row address decoder 422 and a column address decoder 428, respectively. The column address decoder 428 selects bit lines extending through the array 402 corresponding to respective column addresses. The row address decoder 422 is connected to word line driver 424 that activates respective rows of memory cells in the array 402 corresponding to received row addresses. The selected data line (e.g. a bit line or bit lines) corresponding to a received column address are coupled to a read/write circuitry 430 to provide read data to a data output buffer 434 via an input-output data bus 440. Write data are applied to the memory array 402 through a data input buffer 444 and the memory array read/write circuitry 430.

The input data buffer 444 may receive data from a memory controller, for example, for storing in the array 402 in response to a write command, for example. The input data buffer 444 may include a receiver, such as the receiver 202A of FIG. 2, which may include a sense amplifier and a latch, and are configured to sense and latch incoming data based on a clock. The received data may be received over a bi-directional data bus (not shown) that couples the memory 400 to the memory controller. The memory controller may provide the data as data signals that have a large data swing, e.g., 1 volt swing, at a fast slew rate, 10V V/ns for example. The large data swing may be used due to the performance of the input data buffer 444.

The output buffer 434 may provide data stored in the array 402 to the memory controller in response to a read command, for example. The output data buffer 434 may include a transmitter, such as the transmitter 204 of FIG. 2, which may include a pull-up and a pull-down transistor coupled to $V_A$ and ground, respectively. $V_A$ may be less than a power supply Vcc, which may be provided to the memory 400. The data may be provided over the bi-directional bus (not shown) that couples the memory 400 to the memory controller. The output buffer 434 may be configured to provide the data having a small voltage swing, e.g., 0.4 volts, and having a comparatively slow slew rate, 4 V/ns for example, when compared to the slew rate of the received data. The lower voltage swing the output buffer 434 provides the data at may be due to the relative sensitivity of the memory controller.

Memories in accordance with embodiments of the present invention may be used in any of a variety of electronic devices including, but not limited to, computing systems, electronic storage systems, cameras, phones, wireless devices, displays, chip sets, set top boxes, or gaming systems.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus, comprising:
   a controller;
   a memory;
   a control bus coupled between the controller and the memory to transfer a control signal from the controller to the memory; and
   a data bus coupled between the controller and the memory to transfer a first data signal from the controller to the memory and transfer a second data signal from the memory to the controller, the data bus comprising at least one conductor for transmitting symbols as at least one of the first and second data signals, wherein at least one symbol of the symbols is generated by encoding multiple data bits, wherein the first data signal has a first voltage swing;

wherein the second data signal has a second voltage swing, and wherein the first voltage swing is greater than the second voltage swing, wherein the data bus further comprises a plurality of channels, wherein at least one channel of the plurality of channels comprises a plurality of lanes.

2. The apparatus of claim 1, wherein each lane of the plurality of lanes comprises a respective conductor for transmitting the symbols, the at least one conductor being one of the respective conductors for transmitting the symbols.

3. The apparatus of claim 1, wherein a number of the plurality of lanes corresponds to a number of phases encodable in the at least one symbol.

4. The apparatus of claim 1, wherein the at least one symbol of the symbols generated by encoding the multiple data bits comprises two data bits, the at least one symbol included in the first data signal from the controller to the memory.

5. The apparatus of claim 4, wherein another symbol of the symbols generated by encoding multiple data bits comprises more than two data bits, the other symbol included in the second data signal from the memory to the controller.

6. The apparatus of claim 5, wherein the controller operates a higher clock rate than a clock rate of the memory.

7. The apparatus of claim 1, wherein the at least one symbol of the symbols generated by encoding the multiple data bits comprises a portion of a clock signal.

8. The apparatus of claim 1, wherein the controller is configured to provide a clock signal to the memory.

9. An apparatus comprising:

a controller;

a memory;

a control bus coupled between the controller and the memory to transfer a control signal from the controller to the memory; and a data bus coupled between the controller and the memory to transfer a first data signal from the controller to the memory and transfer a second data signal from the memory to the controller, the data bus comprising at least one conductor for transmitting symbols as at least one of the first and second data signals, wherein at least one symbol of the symbols is generated by encoding multiple data bits, wherein the first data signal has a first voltage swing;

wherein the second data signal has a second voltage swing, and wherein the first voltage swing is greater than the second voltage swing, wherein the controller is configured to provide a clock signal encoded in the symbols via the data bus to the memory.

10. An apparatus, comprising:

a controller;

a memory; and a data bus configured to provide a first data signal from the controller to the memory and provide a second data signal from the memory to the controller, the data bus comprising at least one conductor for transmitting respective symbols of the first or second data signals, wherein at least one symbol of the respective symbols is encoded with at least two data bits, wherein the first data signal has a first voltage swing;

wherein the second data signal has a second voltage swing, and wherein the first voltage swing is greater than the second voltage swing, wherein the data bus further comprises a plurality of channels, wherein the first data signal from the controller to the memory is encoded in a differential scheme on the plurality of channels.

11. The apparatus of claim 10, wherein the first data signal encoded in the differential scheme is generated by the controller as the respective symbols.

12. The apparatus of claim 10, wherein the differential scheme on the plurality of channels corresponds to encoding data bits in the first data signal as phase symbols.

13. The apparatus of claim 10, wherein at least one channel of the plurality of channels comprises a plurality of lanes, wherein a number of the plurality of lanes corresponds to a number of phases encodable in a symbol of the respective symbols.

14. The apparatus of claim 13, wherein each lane of the plurality of lanes comprises a respective conductor for transmitting the respective symbols, the at least one conductor being one of the respective conductors for transmitting the respective symbols.

15. The apparatus of claim 10, wherein the second data signal from the memory to the controller is transferred in a non-differential scheme.

16. The apparatus of claim 10, further comprising:

a clock bus configured to transfer a clock signal to the memory from the controller.

17. The apparatus of claim 10, wherein the first data signal further has a first slew rate, wherein the second data signal further has a second slew rate, and wherein the first slew rate is greater than the second slew rate.

18. The apparatus of claim 10, wherein the memory further comprises a receiver configured to receive the first data signal and a transmitter configured to provide the second data signal, the receiver further configured to decode the first data signal, and the transmitter further configured to encode the second data signal.

* * * * *